US012582915B2

(12) United States Patent
Utsugi et al.

(10) Patent No.: US 12,582,915 B2
(45) Date of Patent: Mar. 24, 2026

(54) STORAGE MEDIUM, GAME APPARATUS, GAME SYSTEM, AND GAME PROCESSING METHOD

(71) Applicant: NINTENDO CO., LTD., Kyoto (JP)

(72) Inventors: Shun Utsugi, Kyoto (JP); Miyuki Kimura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 272 days.

(21) Appl. No.: 18/485,545

(22) Filed: Oct. 12, 2023

(65) Prior Publication Data

US 2024/0149166 A1 May 9, 2024

(30) Foreign Application Priority Data

Nov. 9, 2022 (JP) ................................. 2022-179656

(51) Int. Cl.
| | |
|---|---|
| *A63F 13/803* | (2014.01) |
| *A63F 13/533* | (2014.01) |
| *A63F 13/56* | (2014.01) |
| *A63F 13/57* | (2014.01) |
| *A63F 13/577* | (2014.01) |
| *A63F 13/58* | (2014.01) |

(52) U.S. Cl.
CPC .......... *A63F 13/803* (2014.09); *A63F 13/533* (2014.09); *A63F 13/56* (2014.09); *A63F 13/57* (2014.09); *A63F 13/577* (2014.09); *A63F 13/58* (2014.09); *A63F 2300/638* (2013.01)

(58) Field of Classification Search
CPC .......... A63F 13/56; A63F 13/57; A63F 13/58; A63F 13/45; A63F 13/533; A63F 13/577; A63F 13/803; A63F 2300/638
See application file for complete search history.

(56) References Cited

U.S. PATENT DOCUMENTS

| | | | | |
|---|---|---|---|---|
| 8,500,558 | B2 * | 8/2013 | Smith ..................... | A63F 13/92 |
| | | | | 463/31 |
| 8,696,464 | B2 * | 4/2014 | Smith ................... | A63F 13/537 |
| | | | | 463/40 |
| 9,067,133 | B2 * | 6/2015 | Smith ................... | A63F 13/323 |
| 9,592,445 | B2 * | 3/2017 | Smith ................... | A63F 13/46 |
| 10,293,258 | B2 * | 5/2019 | Smith ................ | A63F 13/5258 |
| 11,014,000 | B2 * | 5/2021 | Koyama ............... | A63F 13/211 |

(Continued)

FOREIGN PATENT DOCUMENTS

JP 2022015061 A 1/2022

*Primary Examiner* — Illiam H McCulloch, Jr.
(74) *Attorney, Agent, or Firm* — Nixon & Vanderhye PC

(57) ABSTRACT

At least one is chosen from a plurality of options relating to performance of a player object including at least both a first parameter relating to a crash avoidance time and a second parameter relating to movement performance, according to a user's operation input. A racing game using the plurality of player objects is executed based on performance of each player object determined based on the chosen option. The player object is caused to attack another player object in the racing game. The player object is caused to temporarily crash due to an influence of the attack. The crashed player object is caused to transition to a crash avoidance state in which the crashed player object is forbidden to crash again due to an influence of at least one of attacks, for the crash avoidance time determined based on the first parameter.

20 Claims, 11 Drawing Sheets

12

PO1
(CRASH STATE)

(56) References Cited

U.S. PATENT DOCUMENTS

| | | | | |
|---|---|---|---|---|
| 11,154,785 B2 * | 10/2021 | Nakano | .................. | A63F 13/795 |
| 11,198,058 B2 * | 12/2021 | Yabuki | ................ | G06F 3/04886 |
| 11,439,903 B2 * | 9/2022 | Hayashi | .................. | A63F 13/58 |
| 12,343,630 B2 * | 7/2025 | Kando | ................ | A63F 13/5372 |
| 12,364,922 B2 * | 7/2025 | Kimura | .................. | A63F 13/56 |
| 12,465,857 B2 * | 11/2025 | Polney | ................... | A63F 13/44 |
| 2007/0060359 A1 * | 3/2007 | Smith | ..................... | A63F 13/00 |
| | | | | 463/42 |
| 2008/0004119 A1 * | 1/2008 | Van Luchene | .......... | A63F 13/63 |
| | | | | 463/42 |
| 2009/0144448 A1 * | 6/2009 | Smith | ..................... | A63F 13/52 |
| | | | | 709/246 |
| 2012/0196678 A1 * | 8/2012 | Fujisawa | ............. | A63F 13/5258 |
| | | | | 463/31 |
| 2012/0306854 A1 * | 12/2012 | Yamada | .................. | A63F 13/56 |
| | | | | 345/419 |
| 2013/0296052 A1 * | 11/2013 | Smith | ..................... | A63F 13/31 |
| | | | | 463/31 |
| 2019/0329136 A1 * | 10/2019 | Koyama | ................. | A63F 13/55 |
| 2020/0206639 A1 * | 7/2020 | Nakano | ................... | A63F 13/58 |
| 2022/0008819 A1 * | 1/2022 | Konishi | ............... | A63F 13/426 |
| 2023/0001300 A1 * | 1/2023 | Ikeda | ................... | A63F 13/352 |
| 2023/0293991 A1 * | 9/2023 | Kimura | .................. | A63F 13/47 |
| | | | | 463/6 |
| 2024/0149166 A1 * | 5/2024 | Utsugi | ................. | A63F 13/533 |
| 2025/0073591 A1 * | 3/2025 | Polney | ................... | A63F 13/44 |
| 2025/0073595 A1 * | 3/2025 | Luyendijk | ............... | A63F 13/67 |
| 2025/0161804 A1 * | 5/2025 | Miyamoto | ............ | A63F 13/803 |
| 2025/0161805 A1 * | 5/2025 | Miyamoto | ............ | A63F 13/573 |

* cited by examiner

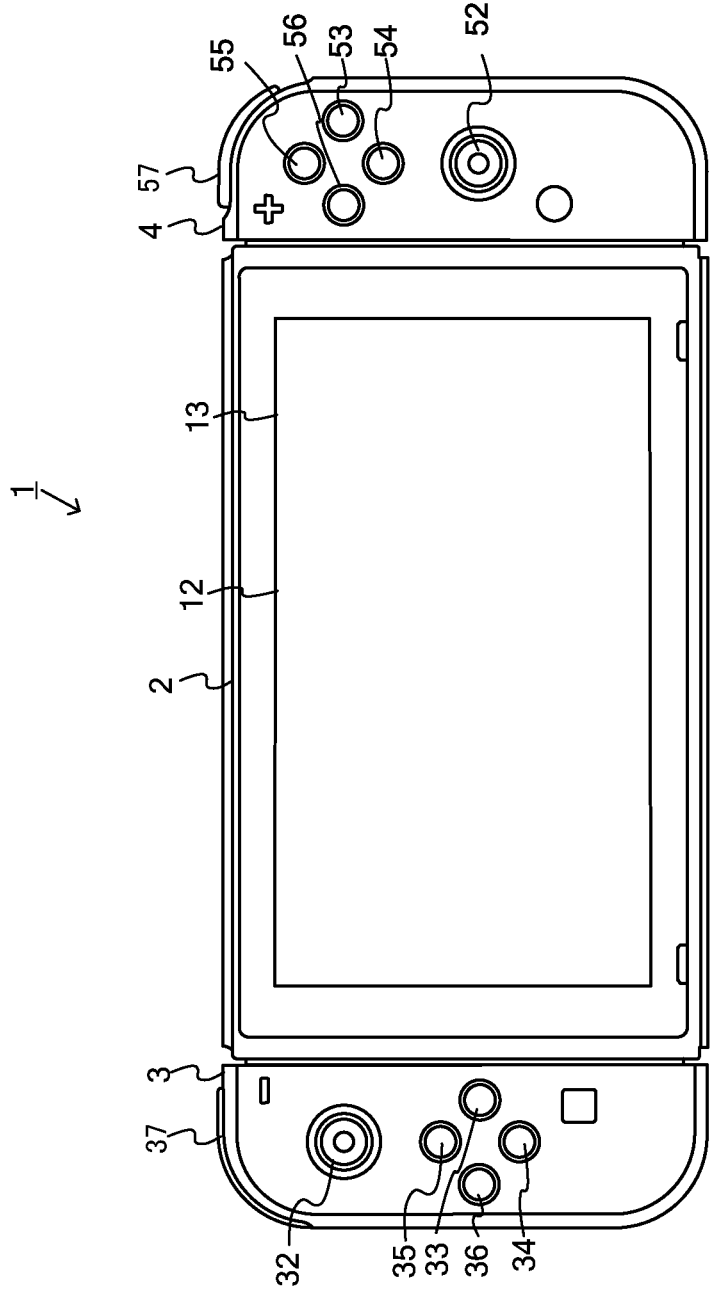
F I G. 1

F I G. 2
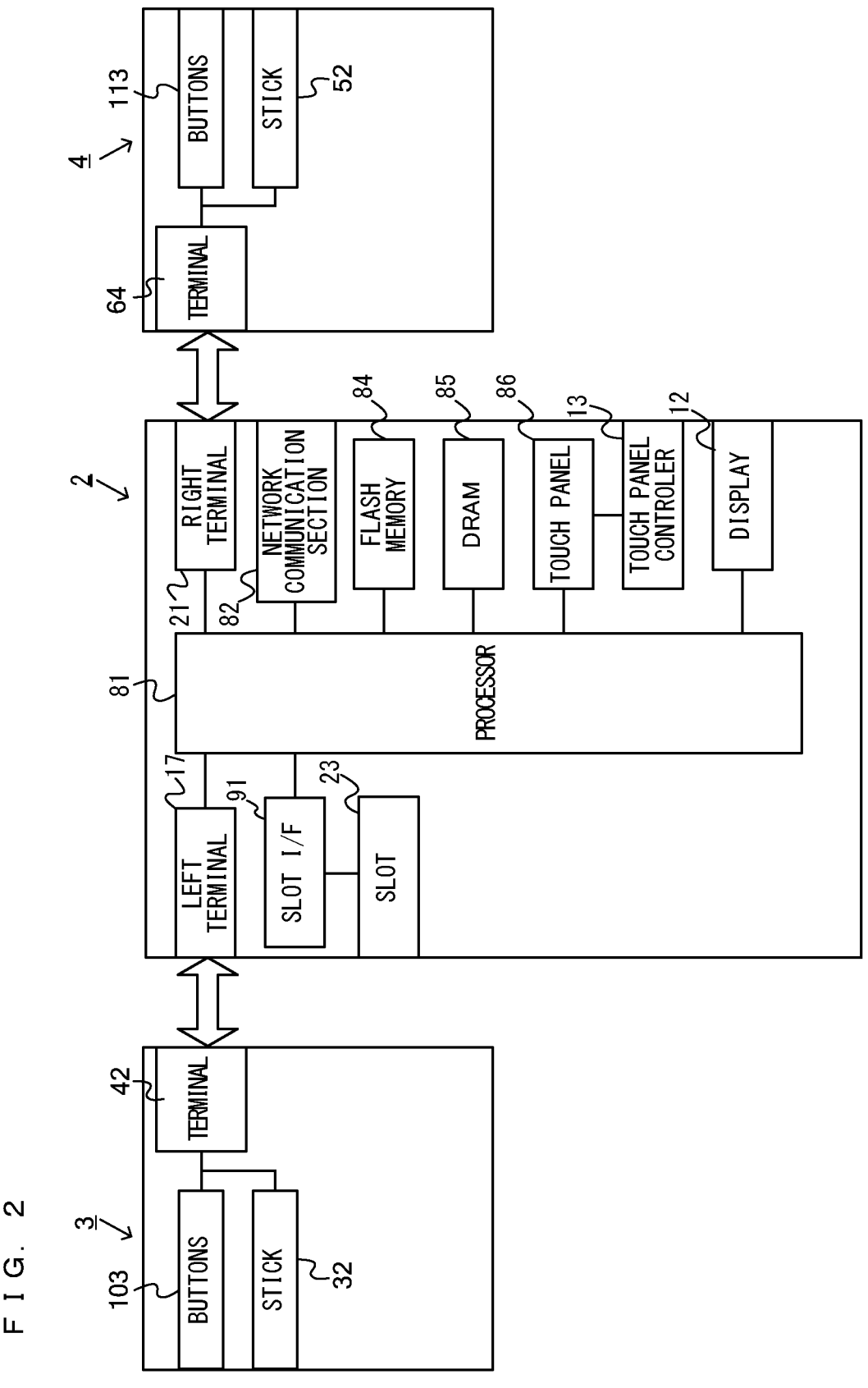

F I G. 3
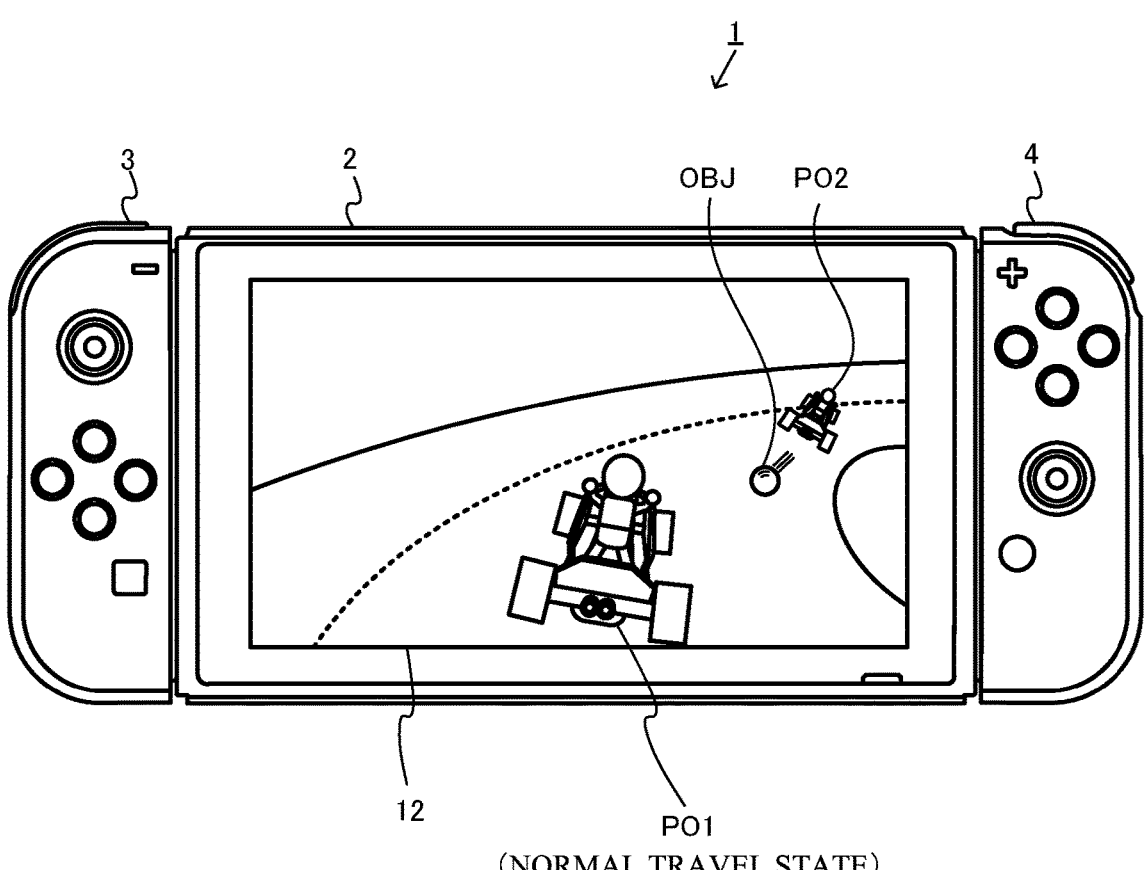
(NORMAL TRAVEL STATE)

F I G.  4
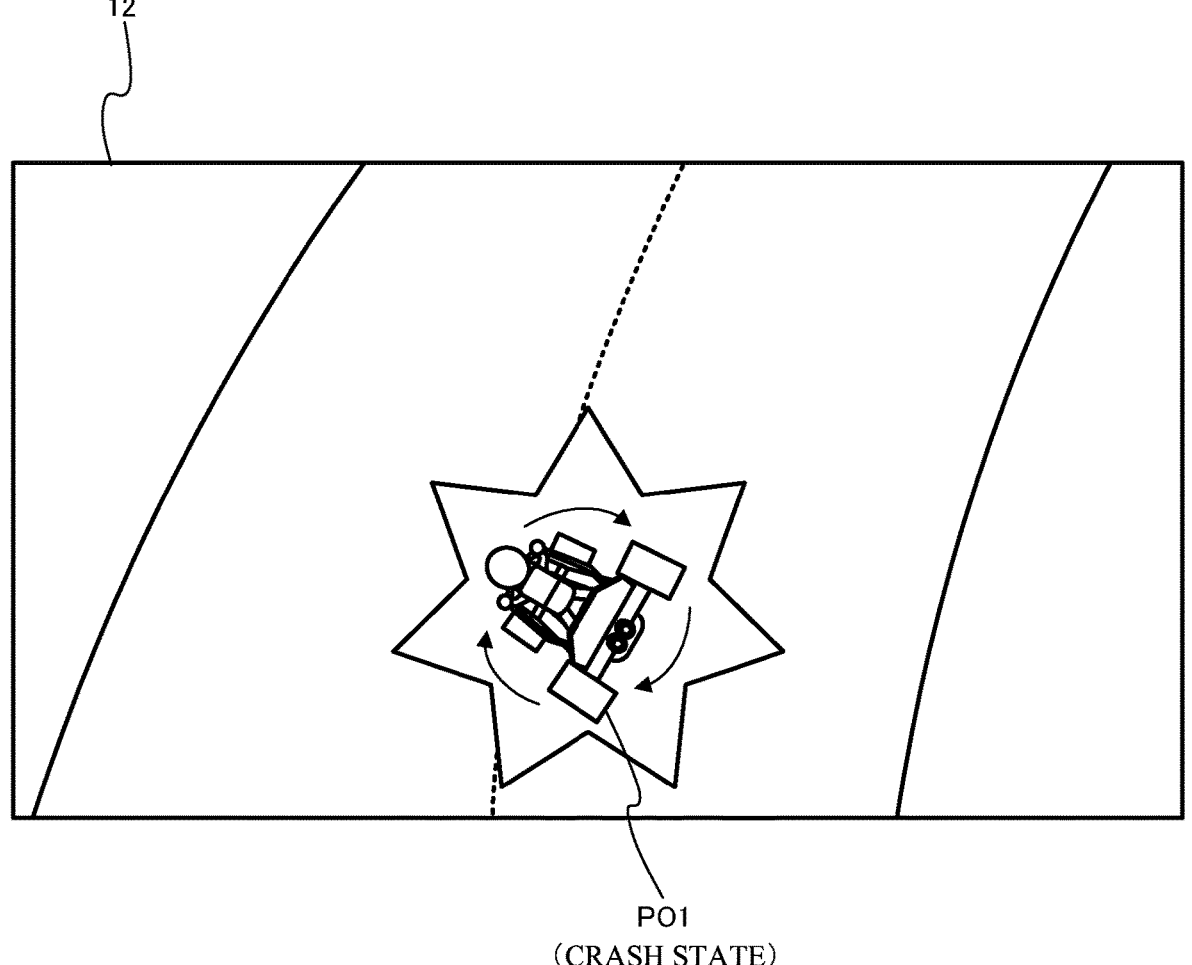
PO1
(CRASH STATE)

F I G.  5
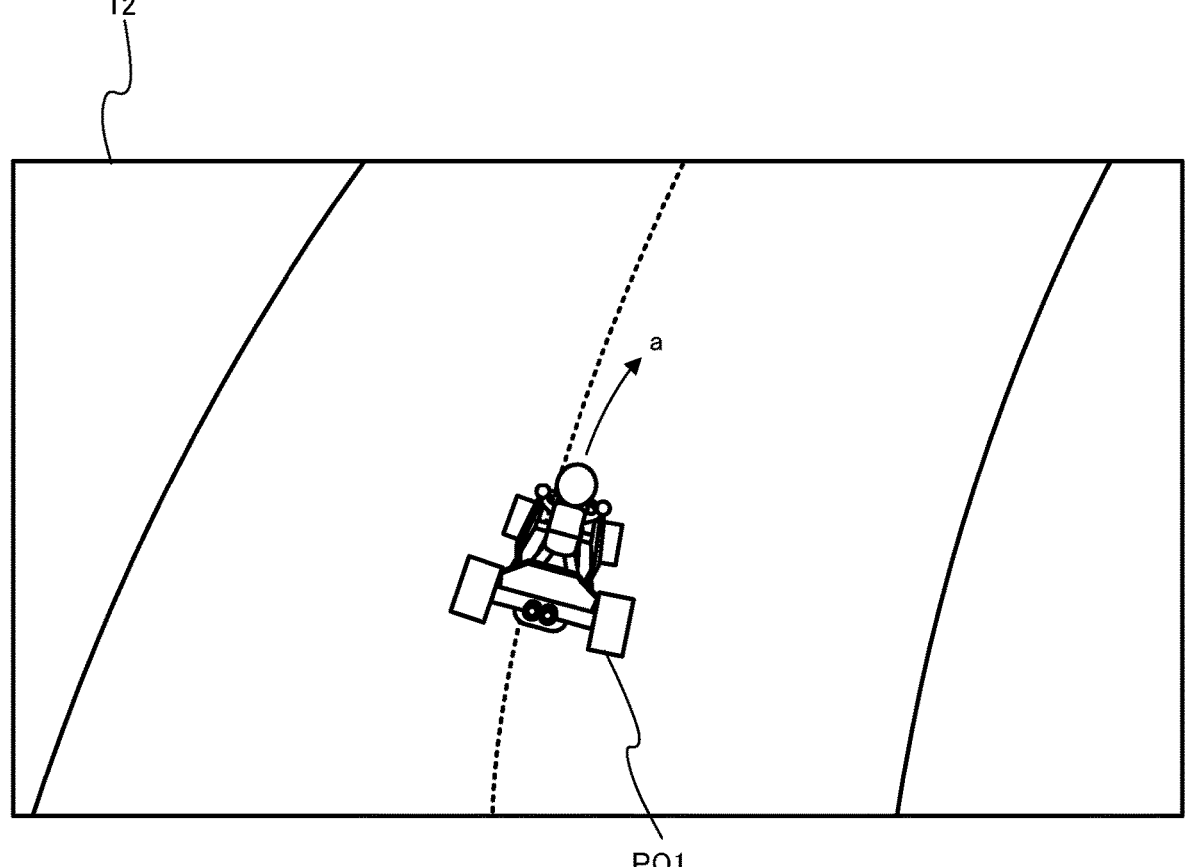
PO1
(NORMAL TRAVEL STATE:
CRASH AVOIDANCE STATE)

F I G.  6
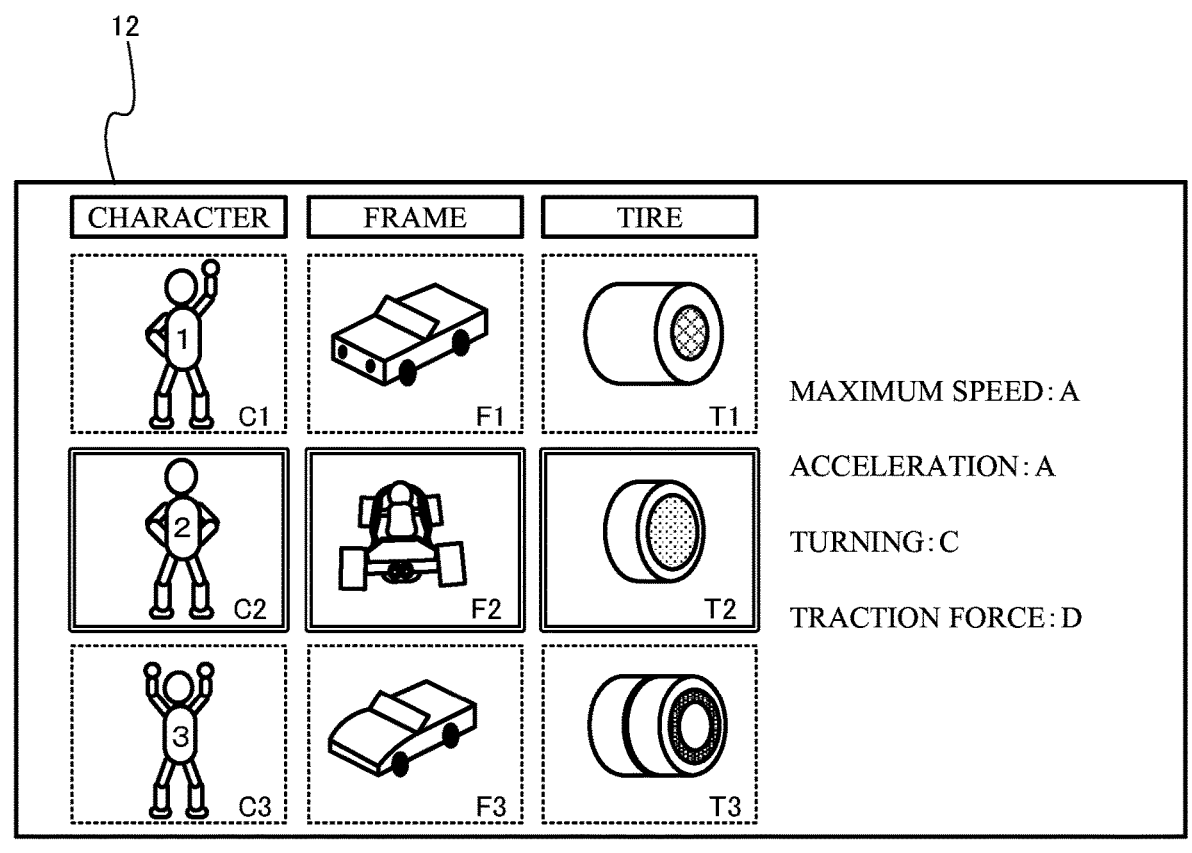

F I G .  7

| TOTAL LEVEL VALUE | CRASH AVOIDANCE TIME RATIO |
|:---:|:---:|
| 1 | 0.50 |
| 2 | 0.54 |
| 3 | 0.57 |
| ⋮ | ⋮ |
| 10 | 1.00 |
| ⋮ | ⋮ |
| 19 | 1.47 |
| 20 | 1.50 |

F I G.  8

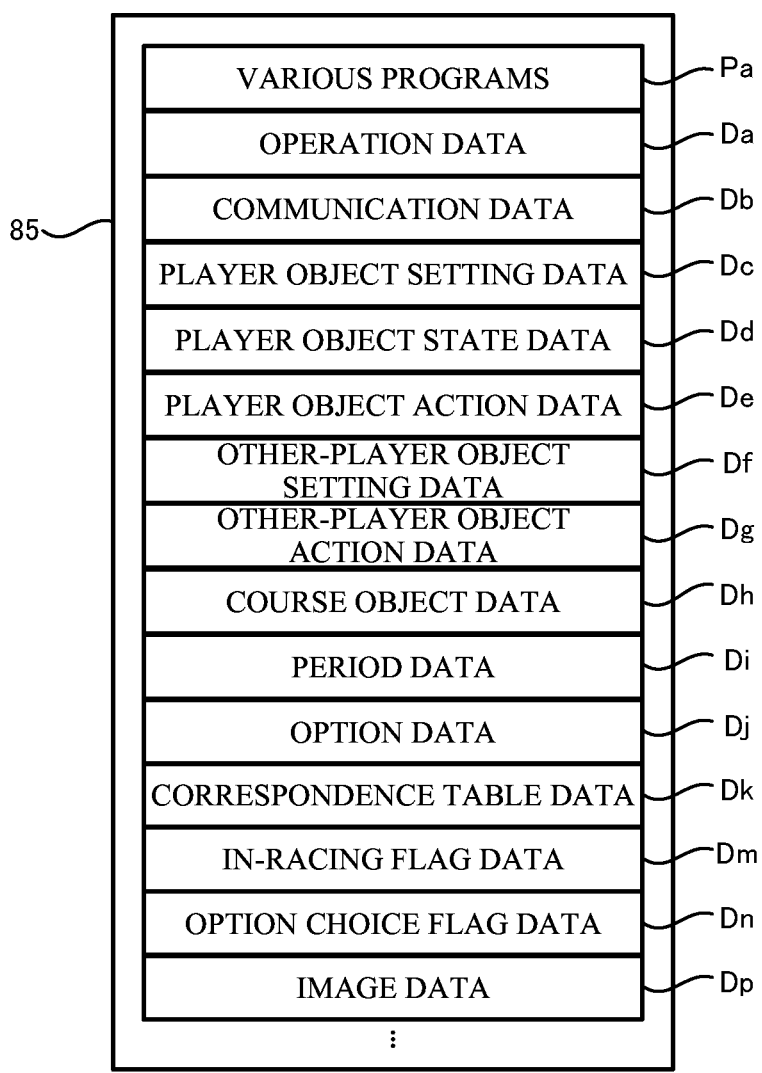

| | |
|---|---|
| VARIOUS PROGRAMS | Pa |
| OPERATION DATA | Da |
| COMMUNICATION DATA | Db |
| PLAYER OBJECT SETTING DATA | Dc |
| PLAYER OBJECT STATE DATA | Dd |
| PLAYER OBJECT ACTION DATA | De |
| OTHER-PLAYER OBJECT SETTING DATA | Df |
| OTHER-PLAYER OBJECT ACTION DATA | Dg |
| COURSE OBJECT DATA | Dh |
| PERIOD DATA | Di |
| OPTION DATA | Dj |
| CORRESPONDENCE TABLE DATA | Dk |
| IN-RACING FLAG DATA | Dm |
| OPTION CHOICE FLAG DATA | Dn |
| IMAGE DATA | Dp |

85

F I G. 9
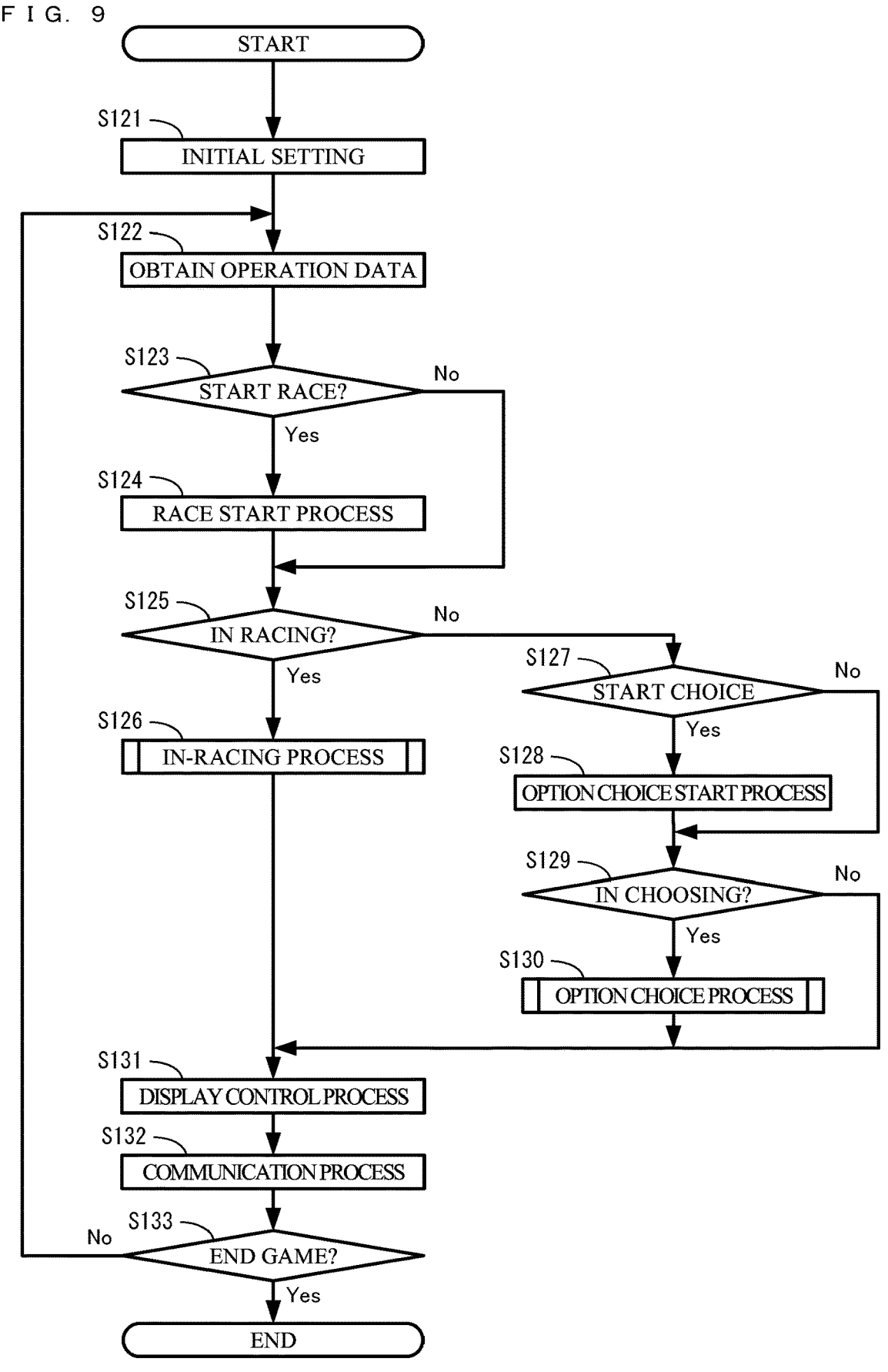

F I G.　1 0
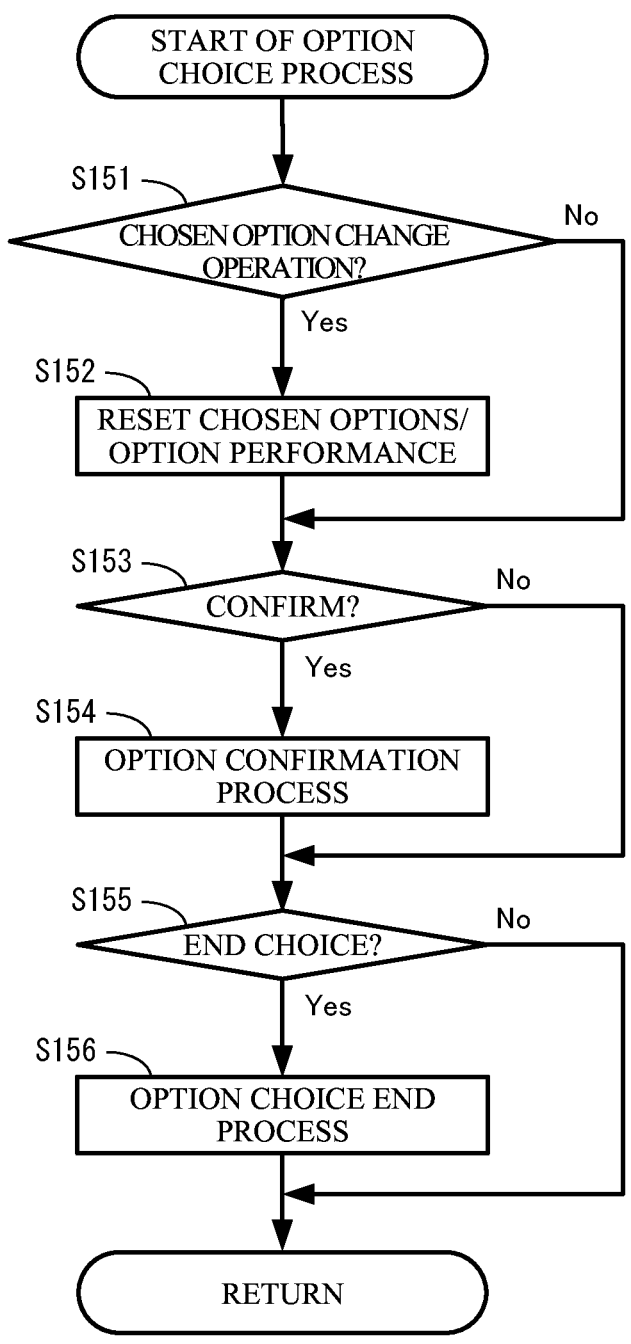

F I G.  1 1
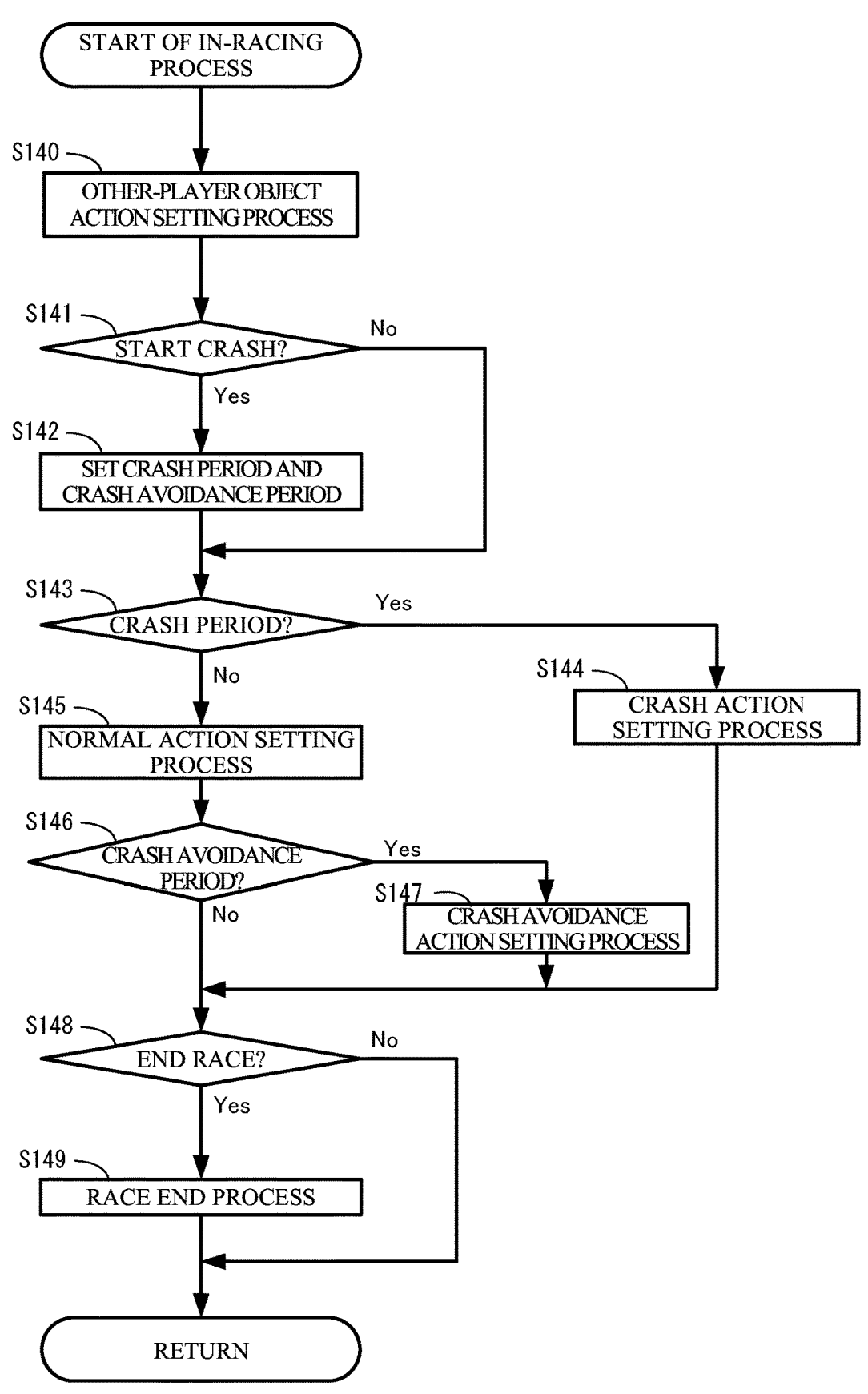

1

STORAGE MEDIUM, GAME APPARATUS, GAME SYSTEM, AND GAME PROCESSING METHOD

CROSS REFERENCE TO RELATED APPLICATIONS

This application claims priority to Japanese Patent Application No. 2022-179656, filed on Nov. 9, 2022, the entire contents of which are incorporated herein by reference.

FIELD

The technology disclosed herein relates to a storage medium, game apparatus, game system, and game processing method that execute a game in a virtual space.

BACKGROUND AND SUMMARY

There has conventionally been an information processing apparatus in which movement performance is changed, depending on a character and parts that are chosen by a user, in a racing game that is played in a virtual space.

However, in such an information processing apparatus, a user may make a biased choice of a character and parts, and therefore, is less likely to choose other characters and other parts, so that the diversity of a game is likely to be reduced.

With the above in mind, it is an object of the present example to provide a game program, game apparatus, game system, and game processing method that are capable of improving the diversity of a game.

To achieve the object, the present example may have features (1) to (9) below, for example.

(1) An example configuration of a non-transitory computer-readable storage medium has stored therein instructions that, when executed, cause a computer of an information processing apparatus to execute game processing for executing a racing game using a plurality of player objects operated by a plurality of users, respectively, in a virtual space, the game processing comprising: choosing at least one from a plurality of options relating to performance of a player object including at least both a first parameter relating to a crash avoidance time and a second parameter relating to movement performance, according to a user's operation input; executing the racing game using the plurality of player objects based on performance of each player object determined based on the chosen option; causing the player object to attack another player object in the racing game; causing the player object to temporarily crash due to an influence of the attack; and causing the crashed player object to transition to a crash avoidance state in which the crashed player object is forbidden to crash again due to an influence of at least one of attacks, for the crash avoidance time determined based on the first parameter.

With the configuration of (1), the crash avoidance time for which a player object is in the crash avoidance state is determined, corresponding to an option chosen by the user. Therefore, the user is highly likely to choose a variety of options according to race strategies, resulting in an improvement in the diversity of a game.

(2) In the configuration of (1), the first parameter may correspond to a ratio with respect to a reference crash avoidance parameter. In the causing the crashed player object to transition to the crash avoidance state, the crash avoidance time may be calculated based on the result of multiplying the reference crash avoidance parameter by the ratio corresponding to the first parameter.

2

With the configuration of (2), all crash avoidance times can be adjusted in the same manner by changing the reference crash avoidance time when it is necessary to adjust the crash avoidance time.

(3) In the configuration of (2), in the causing the crashed player object to transition to the crash avoidance state, the reference crash avoidance parameter may be changed based on a cause of the crash of the crashed player object, and the crash avoidance time of the crashed player object may be calculated.

With the configuration of (3), by setting different reference crash avoidance times for different causes of the crash, the amusingness of the racing game can be improved.

(4) In the configuration of any one of (1) to (3), the game processing may further comprise: controlling an action of the player object operated by the user, according to the user's operation input. In the causing the player object to temporarily crash, the player object in the crash may be caused to transition to a state in which at least acceleration of the player object performed according to the user's operation input is limited. In the causing the crashed player object to transition to the crash avoidance state, the crash avoidance time may be set such that at least a period of time from the time of end of a crash period of the crash is included in the crash avoidance time.

With the configuration of (4), by changing the period of time during which a player object is forbidden to crash again after the exit of the state in which at least the control of acceleration of the player object according to the user's operation input is limited, the operation can be performed, taking the period time into account, resulting in an improvement of the amusingness of the racing game.

(5) In the configuration of (4), in the causing the player object to temporarily crash, the length of the crash period of the crashed player object may be set irrespective of the first parameter set for the crashed player object.

With the configuration of (5), the length of the crash period is not changed according to the chosen option. Therefore, the player object can be caused to perform the same motion during the crash period, resulting in a reduction in the amount of calculation and the cost of development.

(6) In the configuration of (5), in the causing the player object to temporarily crash, the length of the crash period of the crashed player object may be set based on a cause of the crash of the crashed player object. In the causing the crashed player object to transition to the crash avoidance state, the crash avoidance time of the crashed player object may be set based on the cause of the crash of the crashed player object.

With the configuration of (6), the crash period and the crash avoidance time are set based on the cause of the crash. Realistic experience can be enhanced with respect to the cause.

(7) In the configuration of any one of (1) to (6), the choosing at least one from the plurality of options may include displaying an image for prompting to choose from the plurality of option on a display screen. In the displaying the image for prompting to choose, the movement performance determined based on the second parameter set based on the chosen option may be displayed on the display screen without the first parameter set based on the chosen option being displayed on the display screen.

With the configuration of (7), the user can be prevented from being confused due to displaying of the first parameter, and the user is prompted to choose, with a higher priority given to travel performance rather than the first parameter set for the player object.

(8) In the configuration of any one of (1) to (7), in the executing the racing game, a different appearance may be set for the player object, depending on the chosen option, and the racing game may be executed using the plurality of player objects having the respective appearances.

With the configuration of (8), the possibility that the user chooses a variety of options is increased in a racing game in which a different appearance is set for a player object according to a chosen option. Therefore, a racing game in which a number of player objects having a similar appearance participate can be prevented from being played, and player objects can be easily distinguished from each other, resulting in an improvement in the amusingness of a game.

(9) In the configuration of any one of (1) to (8), in the causing the player object to temporarily crash, the player object may be caused to crash due to an influence of an object present in the virtual space without based on the attack of the player object performed in the causing the player object to attack said another player object. In the causing the crashed player object to transition to the crash avoidance state, the crashed player object may be forbidden to crash again due to an influence of at least a portion of the objects present in the virtual space, for the crash avoidance time.

With the configuration of (9), the crash avoidance time for which a player object is in the crash avoidance state in which a player object is forbidden to crash again due to an influence of an object present in the virtual space without based on the player object's attack is determined, corresponding to an option chosen by the user. The possibility that the user chooses a variety of options according to race strategies can be further increased, resulting in a further improvement in the diversity of a game.

In addition, the present example may be carried out in the forms of a game apparatus, a game system, and a game processing method.

According to the present example, the possibility that the user chooses a variety of options according to race strategies can be increased, resulting in an improvement in the diversity of a game.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 1 is a diagram illustrating a non-limiting example of a state in which a left controller 3 and a right controller 4 are attached to a main body apparatus 2, FIG. 2 is a block diagram illustrating a non-limiting example of internal configurations of a main body apparatus 2, a left controller 3, and a right controller 4, FIG. 3 is a diagram illustrating a non-limiting example in which a game image that is captured immediately before a player object PO1 is attacked by another player object PO2 is displayed on a display 12, FIG. 4 is a diagram illustrating a non-limiting example of a game image of a player object PO1 in a crash state, FIG. 5 is a diagram illustrating a non-limiting example of a game image of a player object PO1 in a crash avoidance state, FIG. 6 is a diagram illustrating a non-limiting example that is displayed on a display 12 when options for a player object PO1 are chosen, FIG. 7 is a diagram illustrating a non-limiting example of a correspondence table indicating crash avoidance time ratios corresponding to total level values, FIG. 8 is a diagram illustrating a non-limiting example of a data area set in a DRAM 85 of a main body apparatus 2 in the present example, FIG. 9 is a flowchart illustrating a non-limiting example of a game process that is executed in a game system 1, FIG. 10 is a subroutine illustrating a non-limiting example of details of an option choice process of step S130 of FIG. 9, and FIG. 11 is a subroutine illustrating a non-limiting example of details of an in-racing process of step S126 of FIG. 9.

DETAILED DESCRIPTION OF NON-LIMITING EXAMPLE EMBODIMENTS

A game system according to the present example will now be described. An example of a game system 1 according to the present example includes a main body apparatus (information processing apparatus serving as the main body of a game apparatus in the present example) 2, a left controller 3, and a right controller 4, and serves as an information processing system. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other. In the description that follows, a hardware configuration of the game system 1 of the present example is described, and thereafter, the control of the game system 1 of the present example is described.

FIG. 1 is a diagram illustrating an example of a state in which the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

The main body apparatus 2 includes a display 12. The display 12 displays an image generated by the main body apparatus 2. In the present example, the display 12 is a liquid crystal display device (LCD). The display 12, however, may be a display device of any suitable type.

In addition, the main body apparatus 2 includes a touch panel 13 on the screen of the display 12. In the present example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a slot 23 (see FIG. 2) that is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2.

The left controller 3 includes an analog stick 32 and four operation buttons 33 to 36 that are an example of an operation button. The right controller 4 includes an analog stick 52 and four operation buttons 53 to 56 that are an example of an operation button. These operation buttons are used to give commands depending on various programs (e.g., an OS program and an application program) executed by the main body apparatus 2.

FIG. 2 is a block diagram illustrating an example of internal configurations of the main body apparatus 2, the left controller 3, and the right controller 4. The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication).

The processor 81 is connected to the left-side terminal 17 and the right-side terminal 21. The processor 81 transmits data to the left controller 3 via the left-side terminal 17 and also receives operation data from the left controller 3 via the left-side terminal 17. Further, the processor 81 transmits data to the right controller 4 via the right-side terminal 21 and also receives operation data from the right controller 4 via the right-side terminal 21.

The main body apparatus 2 includes a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input has been performed. Then, the touch panel controller 86 outputs the data to the processor 81.

Further, the display 12 is connected to the processor 81. The processor 81 displays, on the display 12, a generated image (e.g., an image generated by executing the above information processing) and/or an externally obtained image.

The left controller 3 includes buttons 103 (specifically, the buttons 33 to 37). Further, the left controller 3 includes the analog stick ("stick" in FIG. 2) 32. Each of the buttons 103 and the analog stick 32 outputs information regarding an operation performed on itself to the main body apparatus 2 through the terminal 42 repeatedly with appropriate timing.

The right controller 4 includes input sections similar to the input sections of the left controller 3. Specifically, the right controller 4 includes buttons 113 (specifically, the buttons 53 to 57), and the analog stick 52. These input sections have functions similar to those of the input sections of the left controller 3 and operate similarly to the input sections of the left controller 3.

It should be noted that the main body apparatus 2, the left controller 3, and/or the right controller 4 may include respective inertial sensors that output data corresponding to motions and/or orientations of the main body apparatus 2, the left controller 3, and/or the right controller 4, respectively. The result of detection by the inertial sensor is output to the processor 81. The processor 81 is capable of calculating information relating to the motions and/or orientations of the main body apparatus 2, the left controller 3, and/or the right controller 4, based on the detection results of the inertial sensors.

Thus, a game is played in a virtual space displayed on the display 12, according to operations performed on the operation buttons and sticks of the left controller 3 and/or the right controller 4 in the game system 1 when the unified apparatus is formed, touch operations performed on the touch panel 13 of the main body apparatus 2, operations that change motions and/or orientations of the main body apparatus 2, the left controller 3, and/or the right controller 4, or the like. In the present non-limiting example, as an example, a game can be played using a player object in the virtual space, according to the user's operation using the operation buttons, the sticks, and the touch panel 13.

In addition, a single game may be executed between a plurality of game systems 1 that are connected together through a network and a server using the first communication form. The game systems 1 and the server form a client-server system through the network. For example, a game system 1 executes a predetermined application to establish connection to the server, which enables the game system 1 to communicate with the server.

The server communicates with the game systems 1 by exchanging communication packets through the network. As an example, the server executes a process of managing the progression of a game performed along with the game systems 1, a process of storing and managing various types of data required in a game process and a communication process, and the like. In addition, the server establishes a communication link to the game systems 1, and performs data transmission control and routing on the network. When a game is played along with a plurality of game systems 1, the server manages a pairing or grouping of game systems 1 that perform the game, and data communication between those game systems 1. It should be noted that when the system employs a predetermined log-in process for data exchange performed through the network, the server may execute an authentication process to determine whether or not a user who is trying to log in is an authorized user. In addition, the server may be a single server machine or may include a plurality of server machines.

In addition, in another example, a plurality of game systems 1 may be connected together using the second communication form, and a single game may be played between the plurality of game systems 1. For example, one game system 1 executes a predetermined application to establish connect to another game system 1, so that a plurality of game systems 1 can communicate with each other. In that case, the server process is executed in any of the game systems 1 as appropriate. It should be noted that even in the case in which a game is executed by a peer-to-peer (P2P) network of the game systems 1, a portion of functions such as a process of matching up users that participate in a racing game may be executed in the server.

A game process that is executed in the game system 1 will be outlined with reference to FIGS. 3 to 8. It should be noted that FIG. 3 is a diagram illustrating an example in which a game image that is captured immediately before a player object PO1 is attacked by another player object PO2 is displayed on the display 12. FIG. 4 is a diagram illustrating an example of a game image of the player object PO1 in a crash state. FIG. 5 is a diagram illustrating an example of a game image of the player object PO1 in a crash avoidance state. FIG. 6 is a diagram illustrating an example that is displayed on the display 12 when options for the player object PO1 are chosen. FIG. 7 is a diagram illustrating an example of a correspondence table indicating crash avoidance time ratios corresponding to total level values.

The network communication section 82 of the main body apparatus 2 transmits various types of data to other game systems 1 and receives data transmitted from other game systems 1 using the first or second communication form. In a game of the present example, by using a plurality of game systems 1 connected together, a racing game is played in which a player object that is controlled by the user of one game system 1 and another player object (opponent object) that is controlled by the user of another game system 1 appear on the same race course in the virtual space, and compete with each other for a higher rank.

In FIG. 3, the display 12 displays a game image corresponding to a racing game played in the game system 1, showing a scene in which the player object PO1 participates in the racing game, for example. For example, in the racing game, the player object PO1 travels in a kart on a course provided in the virtual space. In the example of FIG. 3, the player object PO1 is traveling in a "normal travel state". On the course, another player object (an opponent object operated by another user) is also traveling in another kart. The player objects compete with each other for a higher rank, i.e., aim to reach a finish line provided on the course earlier. In the example of FIG. 3, as an example of another player object on the course that is operated by another user, a player object PO2 is displayed. It should be noted that another player object described below may include a non-player object whose action is controlled by a computer (e.g., the processor 81). As an example, all participants in a racing game but a player object controlled by the user of a game system 1 may be a non-player object. In that case, the racing game may be played without the game system 1 communicating with any other devices.

A virtual camera for generating a game image is provided so as to capture an image of the player object PO1 from behind the player object PO1 in a travel direction, according to the traveling of the player object PO1.

The user of the game system 1 is allowed to control a movement speed and a movement direction of the player object PO1 in the "normal travel state" by operating the operation buttons and sticks of the left controller 3 and/or the right controller 4. For example, the player object PO1 is accelerated according to the user's accelerating operation (an operation of pressing down an A-button (operation button 53)), and is decelerated according to the user's braking operation (an operation of pressing down a B-button (operation button 54)). In addition, the movement direction of the player object PO1 is changed to the left or right according to the user's steering operation (an operation of tilting the stick 32 to the left or right).

As another example, the player object PO1 may be configured such that the player object PO1 is automatically controlled to travel forward along the course, and the leftward and rightward movement directions of the player object PO1 can be controlled according to the user's steering operation. In addition, the player object PO1 may automatically perform a steering operation to the left and right along the course. As an example, when the course curves to the right, the movement direction of the player object PO1 may be changed to the right to some extent even if the user does not perform a steering operation, and to a further extent if the user performs a steering operation to the right.

In addition, the player object PO1 can attack another player object in a race according to the user's item use operation (an operation of pressing down an L-button (operation button 37)). As an example, the player object PO1 can fire an attack object OBJ carried by the player object PO1 on the course according to the item use operation. It should be noted that a plurality of attack objects OBJ that can be fired by the player object PO1 may be prepared. In that case, one that is fired may be chosen from the attack objects OBJ randomly or according to the user's operation input. In addition, the direction in which attack objects OBJ are fired may be fixed with respect to the player object PO1 (e.g., the forward or backward direction from the player object PO1), or may be based on the user's operation input. In addition, an attack object OBJ may automatically track another player object traveling in front of the player object PO1 or a particular player object, or may be placed on the course.

When the player object PO1 uses an attack object OBJ, the player object PO1 can obtain an advantageous effect in a race, depending on the type of the attack object OBJ. For example, when a fired attack object OBJ1 hits another player object, the traveling of that player object is decelerated or stopped, i.e., obstructed, due to the hit, and that player object may be damaged, depending on the extent of the hit. In addition, an attack object OBJ2 is used and placed on the course. When another player object hits the placed attack object OBJ2, the traveling of that player object is decelerated or stopped.

It should be noted that an object (item) that does not attack any other player objects may be used when the user of the player object PO1 performs an item use operation. For example, when the user of the player object PO1 performs an item use operation, an item may be used which changes the travel performance of the player object PO1 (e.g., accelerating, increasing a maximum speed, improving turning or traction force, and the like).

As illustrated in FIG. 3, the above attack can be performed by another player object. The user of another game system 1 may perform the above item use operation to cause another player object to fire an attack object OBJ. When the player object PO1 is attacked by another player object, the above effect may be given to the player object PO1. The example game image of FIG. 3 shows a scene in which the player object PO2 fires an attack object OBJ at the player object PO1 on the course.

As illustrated in FIG. 4, when the player object PO1 receives an influence of another player object's attack, the player object PO1 may temporarily transition from the "normal travel state" to a "crash state" on the course. Here, in the present example, the "crash state" refers to a state in which the movement speed of the player object PO1 is reduced, and the user's control is limited. In addition, in the "crash state", the player object PO1 may be forced to perform a specific action such as overturning or spinning. It should be noted that, in the present example, the state in which the movement speed is reduced is a state in which the movement speed of the player object PO1 becomes zero. In addition, the state in which the movement speed is reduced includes a state in which the player object PO1 is moved on the course by inertia for a while, depending on the travel state or attacked state. In other words, the state in which the movement speed is reduced includes a state in which the movement speed is reduced without immediately becoming zero. In addition, the state in which the user's control is limited indicates that, at least, even when the user performs an acceleration operation, the player object PO1 is not accelerated or the acceleration of the player object PO1 is limited, but the player object PO1 may be controlled to some extent by the user's steering operation. It should be noted that, in the present example, it may be assumed that, in the "crash state", a crash does not occur again.

As a first example, the "crash state" in the present example occurs due to an attack object OBJ used by another player object. Specifically, as an example, the "crash state" may be caused due to hit by an attack object OBJ fired by another player object. In addition, as an example, the "crash state" may be caused due to hit by an attack object OBJ placed on the course by another player object. It should be noted that the "crash state" can occur when a player object hits an attack object OBJ placed by itself. In addition, some attack objects OBJ may not cause the "crash state" even when hit. In addition, as an example, the "crash state" may be caused when an attack object OBJ used in a player object's attack directly hits another player object, which in turn transitions to the "crash state", which generates, on the course, a strong blast or explosion that has an influence on the attacking player object. In addition, as an example, the "crash state" may be caused when an attack object OBJ fired by a player object's attack causes a state change such as charging of the course on which the player object travels, and the player object touches the course whose state has thus changed.

As a second example, in the present example, the "crash state" is caused by a specific obstacle (course object) present on the course, irrespective of the use of an attack object OBJ by a player object. Specifically, as an example, the "crash state" may be caused due to hit on a course object. In addition, as an example, the "crash state" may be caused by passing over a specific course object. The specific obstacle may be placed and fixed to the course, or moved on the course, may change its appearance on the course, or may appear or disappear on the course. The specific obstacle in the present example may, for example, be another vehicle that travels independently of a race, an opponent object, an animal, oil, water, fire, or the like. It should be noted that the specific obstacle in the present example may be a special course object, but not other player objects or structures typically present in a racing game, such as a curb, wall, guardrail, and ditch. In the present example, the causes of the "crash state" do not include the case in which a player object stops when the player object hits another player object or the above structures, the player object deviates from the course, or the like. In another example, for example, a player object may transition to the "crash state" when the player object hits another player object.

The length of a crash period during which a player object is in the "crash state" may be previously determined, or may be set, depending on the cause of the "crash state" of the player object. In the latter case, the length may be roughly classified into a plurality of categories (e.g., two categories), depending on the cause of the "crash state" of a player object. In this case, the movement speed or the specific action that a player object is forced to perform in the "crash state" may be varied, depending on which of the first crash period length or the second crash period length is set. Thus, the set length of the crash period of the "crash state" is limited to some extent. As a result, it is no longer necessary to finely change the motion or speed of a player object during the crash period, and therefore, the amount of calculation of a "crash state" scene and the cost of developing such a scene can be reduced.

It should be noted that, in another example, the length of the crash period during which a player object is in the "crash state" may be set, depending on a type of the player object (e.g., the type of an option for a player object described below). In that case, the length may be roughly classified into a plurality of categories (e.g., two categories), depending on the degree of damage leading to the "crash state" of a player object or the type of a player object. A first crash period length is set for a category in which the damage is relatively great, leading to a strong crash state or a category of a type of player object that is likely to be damaged. A second crash period length that is shorter than the first crash period length is set for a category in which the damage is relatively small, leading to a weak crash state or a category of a type of player object that is less likely to be damaged.

As illustrated in FIG. 5, in the racing game of the present example, when the crash period ends, the player object PO1 is returned from the "crash state" to the "normal travel state", in which the player object PO1 can be controlled by the user. In the "normal travel state" after the end of the crash period, the user is allowed to operate the player object PO1 by accelerating or decelerating the player object PO1 or changing the movement direction of the player object PO1 according to the user's accelerating operation, steering operation, or the like (e.g., the player object PO1 is controlled according to the user's operation input such that the player object PO1 moves in a direction 'a' illustrated). In addition, in the "normal travel state" after the end of the crash period, an attack object OBJ can be used according to the user's item use operation.

In addition, in the racing game in the present example, a portion of the period of time of the "normal travel state" that starts after the end of the crash period is set as a "crash avoidance state" in which the player object PO1 is not caused to crash again from the time when the player object PO1 is returned from the "crash state" to the "normal travel state". In the "crash avoidance state", even when a cause that would otherwise cause a player object in the "crash avoidance state" to transition to the "crash state" again occurs, the player object is not caused to crash again. Thus, in the "crash avoidance state", even when a cause that would otherwise cause a player object to transition to the "crash state" again occurs, the player object does not transition to the "crash state" again.

In addition, the "crash avoidance state" is set in a portion of the period of time of the "normal travel state". Therefore, in the "crash avoidance state", the player object PO1 performs a traveling action on the course according to the user's operation input as in the "normal travel state" that is not the "crash avoidance state", and is displayed on the display 12 in the same way as in the "normal travel state" that is not the "crash avoidance state". Thus, in the present example, the user who operates the player object PO1 can perform a game play without knowing that the player object PO1 in the "crash avoidance state". As another example, an indication that allows the user to know that the player object PO1 is in the "crash avoidance state" may be provided (e.g., information indicating the "crash avoidance state" or the remaining time of the crash avoidance period of the "crash avoidance state" is displayed).

The length (crash avoidance time) of the crash avoidance period during which the player object PO1 is in the "crash avoidance state" is set based on an option (equipment and a character on board) of the player object PO1. As illustrated in FIG. 6, the user chooses an option for the player object PO1 operated by the user to set the player object PO1 before the start of a race, which allows the player object PO1 to participate in the race. Here, by choosing an option, at least, the movement performance, and performance including a parameter corresponding to a crash avoidance time ratio, of the player object PO1 are set. The player object PO1's performance in a racing game is determined based on an option chosen by the user, and the player object PO1's appearance is also set based on the chosen option.

For example, as a list of options that can be chosen is displayed in an option choice screen of the display 12, the user is prompted to choose any of the options. In the example option list of FIG. 6, the user is allowed to choose one from each of groups such as characters that sit on the player object PO1, frames of the player object PO1, tires of the player object PO1, and the like. Specifically, an image is displayed which prompts the user to choose any of a character C1, a character C2, and a character C3 belonging to a group of characters that sit on the player object PO1, as an option of character that sits on the player object PO1. In addition, an image is displayed which prompts the user to choose any of a frame F1, a frame F2, and a frame F3 belonging to a group of frames as an option of frame with which the player object PO1 is equipped. In addition, an image is displayed which prompts the user to choose any of a tire T1, a tire T2, and a tire T3 belonging to a group of tires as an option of tire with which the player object PO1 is equipped. It should be noted that the example of FIG. 6 indicates that the character C2, the frame F2, and the tire T2 have been chosen by the user from options (a list of options) presented to the user, as options of the player object PO1 that participates in a racing game.

A performance grade is set for each option (a character and equipment) that can be chosen by the user. In the present example, as an example of the performance grades, travel performance that is provided for choices from a plurality of options is set. For example, for the travel performance, maximum speed, acceleration, turning, traction force, and the like that are provided when the player object PO1 travels on the course using the chosen options are set. In the present example, the travel performance that is obtained by choosing some from the plurality of options is displayed on the display 12.

When the user performs an operation of determining equipment for the player object PO1 and a character that sits on the player object PO1 from a plurality of options, the travel performance of the player object PO1 is determined, and the appearance of a combination of the chosen options, i.e., the equipment and the character on board, is set as the appearance of the player object PO1. For example, when the driver character C2 is determined as a character that sits on the player object PO1 that participates in a racing game, and the frame F2 and the tire T2 are determined as equipment for the player object PO1, the player object PO1 that has an appearance that the driver character C2 sits on a kart obtained by combining the frame F2 with the tire T2 is set.

In addition, in the present example, when the user performs an operation of choosing and determining a character that sits on the player object PO1 and equipment for the player object PO1 from a plurality of options, the crash avoidance time ratio of the player object PO1 is also set in addition to the travel performance. The crash avoidance time ratio is an example of a parameter that is used to calculate the crash avoidance time for which the player object PO1 is in the "crash avoidance state". The crash avoidance time ratio is a multiplication factor with respect to a reference crash avoidance time. In the present example, a level value (e.g., level 0 to level 5) for calculating the crash avoidance time ratio is set for each piece of equipment and each character on board. Thereafter, the level values of options determined according to the user's operation of determining options for the player object PO1 are added up to obtain a total level value, and the crash avoidance time ratio is calculated using the total level value. It should be noted that the level value corresponds to an example of a first parameter.

As illustrated in FIG. 7, in the calculation of the crash avoidance time ratio, a correspondence table is used in which crash avoidance time ratios corresponding to total level values are described. For example, in the correspondence table used in the present example, crash avoidance time ratios corresponding to total level values of 1 to 20 are described. As an example, the crash avoidance time ratios are set such that the crash avoidance time ratios gradually increase, corresponding to the respective total level values, when the total level values gradually increase. Specifically, the crash avoidance time ratio gradually increases from the minimum value of 0.50 corresponding to the smallest total level value of 1 to the maximum value of 1.50 corresponding to the greatest total level value of 20, where the crash avoidance time ratio of 1.00 corresponds to the total level value of 10 as a center.

The crash avoidance time for which the player object PO1 is in the "crash avoidance state" is calculated by multiplying the reference crash avoidance time by the calculated crash avoidance time ratio. Here, the reference crash avoidance time is an example of a parameter for calculating the crash avoidance time of the player object PO1, and may be set to a predetermined time or may be set, depending on the cause of the "crash state" of the player object PO1. In the latter case, the reference crash avoidance time may be roughly classified into a plurality of categories (e.g., two categories), depending on the cause of the "crash state" of the player object PO1. A first reference crash avoidance time is set for the player object PO1 when the player object PO1 is classified into a category in which the damage is relatively great, leading to a strong crash state. A second reference crash avoidance time that is shorter than the first reference crash avoidance time is set for the player object PO1 when the player object PO1 is classified into a category in which the damage is relatively small, leading to a weak crash state. It should be note that the reference crash avoidance time corresponds to an example of a reference crash avoidance parameter.

Thus, the reference crash avoidance time is multiplied by the crash avoidance time ratio corresponding to a total level value. Therefore, all crash avoidance times can be adjusted in the same manner by changing the reference crash avoidance time when it is necessary to adjust the crash avoidance time. For example, in the case in which, for each option, a crash avoidance time is set for each cause of the "crash state", it is considered that the storage capacity for the setting is consumed, and the cost of development relating to the setting of crash avoidance times increases. However, in the present example, crash avoidance time ratios corresponding to total level values are used, and therefore, a crash avoidance time can be set for each option using a single correspondence table. As a result, these problems can be overcome. In addition, by setting different reference crash avoidance times for different causes of the "crash state", the amusingness of the racing game can be improved.

It should be noted that the option choice screen (FIG. 6) of the display 12 does not show the total level value obtained by choosing a character that sits on the player object PO1 and equipment for the player object PO1 from a plurality of options, or the level value set for each option that can be chosen. Specifically, the option choice screen of the present example shows travel performance that is set for the player object PO1, depending on chosen options, but not a level value for setting a crash avoidance time set for the player object PO1, depending on chosen options. In the case in which no other player objects appear in a race, or in which the user attaches importance to the travel performance of a player object operated by themselves, it is not necessary to choose options based on the level value, and the user can be prevented from being confused due to displaying of the level value. It should be noted that in the case in which such an effect is not expected, a level value for each option, a crash avoidance time that is set by choice, and the like may be displayed in the option choice screen.

When the crash avoidance time thus set has passed, the player object PO1 continues the racing game in the "normal travel state" after the end of the "crash avoidance state". It should be noted that when the player object PO1 is traveling in the "normal travel state" after the end of the "crash avoidance state", the player object PO1's action can be controlled according to the user's operation input, and when a cause of the "crash state" occurs, the player object PO1 can transition to the "crash state" again. It should be noted that the starting point of the crash avoidance time may not be the time when the player object PO1 is returned from the "crash state" to the "normal travel state", and may be earlier than that time.

Thus, in the present example, if, when the player object PO1 is traveling in the "normal travel state", a cause of the "crash state" occurs in the player object PO1, the player object PO1 transitions to the "crash state", and after the crash period has passed, transitions to the "normal travel state" that is the "crash avoidance state". After the crash avoidance time has passed since the player object PO1 transitioned to the "crash avoidance state", the player object PO1 transitions to the "normal travel state" in which the "crash avoidance state" has ended.

Here, in the case in which only the travel performance of the player object PO1 is set for options chosen by the user, the user's choice may be biased for specific options due to an environment on the course or the like. In the present example, a period of time for which the player object PO1 is in the crash avoidance state in which a crash caused by another player object's behavior can be avoided is also determined, corresponding to chosen options. Therefore, the user is highly likely to choose a variety of options according to race strategies, and therefore, a variety of options may be chosen in a racing game in the present example.

In addition, when game balance is adjusted, then if the travel performance of a player object is changed, the user who has got accustomed to the previous travel performance may feel unnaturalness in operation, or continuity to the previous records may be lost when a mode such as speed-running is continued. Meanwhile, when the period of time for which a player object is in the crash avoidance state in the present example is changed, there is not an influence on the travel performance of the player object itself, and a player object operated by the user themselves basically travels alone in a mode such as speedrunning, and the "crash state" caused by another player object's action does not occur, and therefore there is a less influence on the result of the speedrunning, and the continuity of records in a mode such as speedrunning can be maintained.

Furthermore, in the case in which only the travel performance of a player object is set, corresponding to options chosen by the user, the user's choice may be biased for specific options as described above. In a racing game in which player objects operated by a plurality of users participate, all of the player objects may have the same appearance. In contrast to this, in the present example, it is highly likely that different player objects are set to different appearances, depending on chosen options, and a racing game is played using the plurality of player objects having the respective appearances, and as described above, users choose a variety of options. Therefore, in the present example, a racing game in which numerous player objects having similar appearances participate can be avoided. Therefore, the player object PO1 operated by the user and other player objects can be more easily distinguished from each other, and thus, a variety of player objects travel, resulting in an improvement in the amusingness of a game.

It should be noted that the level value for calculating a crash avoidance time ratio set for each option that can be chosen (a driver character and equipment) may be other parameters. As an example, the level value may be the crash avoidance time itself or the crash avoidance time ratio itself. In the former case, by adding up crash avoidance times set for respective chosen options, the crash avoidance time for which the player object PO1 is in the "crash avoidance state" is calculated. In the latter case, by adding up crash avoidance time ratios set for respective chosen options, the crash avoidance time ratio corresponding to all of the chosen options is calculated. It should be noted that a crash avoidance time or crash avoidance time ratio set for each option may be set to a time or ratio that varies depending on the cause of the "crash state" of the player object PO1, or may be set to the same time or ratio even through the cause is varied.

In addition, the parameter for calculating a crash avoidance time may be set not only for each option that can be chosen (a driver character and equipment) but also for a combination of options. For example, the parameter for calculating a crash avoidance time may be the level value, the crash avoidance time itself, the crash avoidance time ratio itself, or other parameters for a combination of chosen options. Even in that case, in determination of a combination of chosen options, a parameter for identifying each option may be used.

In addition, options (a driver character and equipment) chosen by the user contribute to at least both of the travel performance of the player object PO1 and the length of the period of time of the crash avoidance state. For a non-player object whose action is controlled by a computer, options chosen by the computer may contribute to the travel performance of the non-player object and the length of the period of time of the crash avoidance state.

In addition, a player object in the "crash avoidance state" may transition to the "crash state" due to exceptional causes. For example, when the player object PO1 is attacked by another player object having a special attack ability to force the player object PO1 to exit the "crash avoidance state", the player object PO1 may transition to the "crash state" irrespective of the "crash avoidance state". In other words, in the crash avoidance state of the present example, the "crash state" can be avoided for at least a portion of causes of the "crash state".

In addition, options that can be chosen by the user may be able to be chosen from at least one group. For example, in the case in which the option choice screen of FIG. 6 is used, only tires may be able to be chosen by the user, only frames may be able to be chosen by the user, or only characters may be able to be chosen by the user.

In addition, some of options that can be chosen by the user may not contribute to the length of the period of time of the crash avoidance state. For example, options that can be chosen by the user may include an option that has an influence on only the travel performance of a player object, and an option that does not contribute to the travel performance of a player object, and changes only the appearance of a player object (e.g., an option of character that sits on a player object). In addition, options that can be chosen by the user may include those that do not have an influence on the appearance of a player object.

Next, an example of a specific process that is executed in the game system 1 will be described with reference to FIGS. 8 to 11. FIG. 8 is a diagram illustrating an example of a data area set in the DRAM 85 of the main body apparatus 2 in the present example. It should be noted that in addition to the data of FIG. 8, the DRAM 85 also stores data used in other processes, which will not be described in detail.

Various programs Pa that are executed in the game system 1 are stored in a program storage area of the DRAM 85. In the present example, the programs Pa include a communication program for communicating with other game systems and a server, an application program for executing an information process (e.g., a game process) based on data obtained from the left controller 3 and/or the right controller 4, and the like. Note that the programs Pa may be previously stored in the flash memory 84, may be obtained from a storage medium removably attached to the game system 1 (e.g., a storage medium attached to the slot 23) and then stored in the DRAM 85, or may be obtained from another apparatus via a network, such as the Internet, and then stored in the DRAM 85. The processor 81 executes the programs Pa stored in the DRAM 85.

In addition, the data storage area of the DRAM 85 stores various kinds of data that are used in processes that are executed in the game system 1 such as a communication process and an information process. In the present example, the DRAM 85 stores operation data Da, communication data Db, player object setting data Dc, player object state data Dd, player object action data De, other-player object setting data Df, other-player object action data Dg, course object data Dh, period data Di, option data Dj, correspondence table data Dk, in-racing flag data Dm, option choice flag data Dn, image data Dp, and the like.

The operation data Da is obtained, as appropriate, from each of the main body apparatus 2, the left controller 3, and/or the right controller 4. As described above, the operation data obtained from each of the main body apparatus 2, the left controller 3, and/or the right controller 4 includes information about an input from each input section (specifically, each button, an analog stick, or each sensor) (specifically, information about an operation, or the result of detection by a sensor). In the present example, operation data is obtained from each of the main body apparatus 2, the left controller 3, and/or the right controller 4 at predetermined time intervals. The obtained operation data is used to update the operation data Da as appropriate. It should be noted that the operation data Da may be updated for each frame that is the cycle of a process executed in the game system 1, or may be updated each time operation data is obtained.

The communication data Db includes data that is transmitted to other apparatuses (other game systems 1, a server, and the like) and data that is received from other apparatuses. For example, the communication data Db includes operation data that indicates operations performed using the game system 1, data relating to the setting, state, action, and the like of the player object PO1, data indicating a request sent to a server, data sent back to a server, operation data of other users using other game systems 1, data relating to the settings, states, actions, and the like of other player objects controlled by other game systems 1, data indicating the result of a process by a server, data indicating a server's request, and the like.

The player object setting data Dc indicates options (a driver character and equipment) set for the player object PO1 operated by the user of the game system 1, travel performance and a total level value set for the player object PO1, the types, number, and the like of attack objects OBJ carried by the player object PO1, and the like.

The player object state data Dd indicates states (the normal travel state, crash state, and crash avoidance state) of the player object PO1 operated by the user of the game system 1.

The player object action data De indicates the location, pose, and various parameters of the player object PO1 operated by the user of the game system 1 in the virtual space, and the type, location, orientation, state, and the like of an attack object OBJ fired in the virtual space by the player object PO1 for attack.

The other-player object setting data Df indicates options (a driver character and equipment) set for other player objects operated by the users of other game systems 1, and the types, number, and the like of attack objects OBJ carried by other player objects.

The other-player object action data Dg indicates the locations, poses, and various parameters of other player objects operated by the users of other game systems 1 in the virtual space, and the types, locations, orientations, states, and the like of attack objects OBJ fired in the virtual space by other player objects for attack.

The course object data Dh indicates the type, location, and the like of a course object placed on a course.

The period data Di indicates set periods of time.

The option data Dj relates to options that are presented to the user.

The correspondence table data Dk relates to a correspondence table in which crash avoidance time ratios corresponding to total level values are described.

The in-racing flag data Dm indicates an in-racing flag that is set on when a race is under way in which a plurality of player objects participate. The option choice flag data Dn indicates an option choice flag that is set on when the player object PO1 is choosing options.

The image data Dp is for displaying, on the display 12, images (e.g., an image of the player object PO1, images of other player objects, images of other objects, an image of a race course, a background image, and the like).

Next, a detailed example of a game process in the present example will be described with reference to FIGS. 9 to 11. FIG. 9 is a flowchart illustrating an example of a game process that is executed in the game system 1. FIG. 10 is a subroutine illustrating an example of details of an option choice process of step S130 of FIG. 9. FIG. 11 is a subroutine illustrating an example of details of an in-racing process of step S126 of FIG. 9. In the present example, a series of steps illustrated in FIGS. 9 to 11 are executed by the processor 81 executing a communication program and a predetermined application program (game program) included the programs Pa. The game process of FIGS. 9 to 11 is started with any appropriate timing.

It should be noted that the steps in the flowcharts of FIGS. 9 to 11, which are merely illustrative, may be executed in a different order, or another step may be executed in addition to (or instead of) each step, if a similar effect is obtained. In the present example, it is assumed that the processor 81 executes each step of the flowcharts. Alternatively, a portion of the steps of the flowcharts may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 9 to 11 may be executed by a plurality of information processing apparatuses including the main body apparatus 2 cooperating with each other.

In FIG. 9, the processor 81 executes initial setting for a game process (step S121), and proceeds to the next step. For example, in the initial setting, the processor 81 initializes parameters for executing processes described below, and updates various data.

Next, the processor 81 obtains operation data from the main body apparatus 2, the left controller 3, and/or the right controller 4, updates the operation data Da (step S122), and proceeds to the next step.

Next, the processor 81 determines whether or not to start a race (step S123). As an example, if the processor 81 determines to start a race in which a plurality of player objects participate, the result of the determination in step S123 is positive. If the processor 81 determines to start a race, the processor 81 proceeds to step S124. Otherwise, i.e., if the processor 81 determines not to start a race, or if a race has already begun (i.e., a race is under way) (the in-racing flag is on), the processor 81 proceeds to step S125.

In step S124, the processor 81 executes a race start process, and proceeds to step S125. For example, the processor 81 sets, in the communication data Db, data indicating details of a race for requesting to participate in a racing game and detailed settings (a driver character, equipment, and the like) for the player object PO1 that participates in the racing game. In addition, the processor 81 refers to the communication data Db, and sets options (a driver character and equipment) for the player object PO1 operated by the user and other player objects operated by the users of other game systems 1, based on information that is received from a server and in which player objects that participate in a race are matched up, and updates the player object setting data Dc and the other-player object setting data Df. In addition, the processor 81 sets data for causing game systems 1 operated by other users that participate in a racing game to start the racing game, as transmission data, in the communication data Db, and obtains data that is received from the game systems 1 operated by those other users and that is used to start the racing game. In addition, the processor 81 generates a virtual space in an initial state by arranging player objects, course objects, and the like on a course in the virtual space. The processor 81 also sets the performance, appearance, and the like of player objects that participate in the racing game, based on the player object setting data Dc and the other-player object setting data Df, and updates the player object action data De, the other-player object action data Dg, and the course object data Dh. Thereafter, the processor 81 sets the in-racing flag on, and updates the in-racing flag data Dm.

In step S125, the processor 81 determines whether or not a race is under way. For example, if the in-racing flag indicated by the in-racing flag data Dm is on, the result of the determination by the processor 81 in step S125 is positive. If a race is under way, the processor 81 proceeds to step S126. Otherwise, i.e., if a race is not under way, the processor 81 proceeds to step S127.

In step S127, the processor 81 determines whether or not to start option choice. For example, if the user has performed an operation of starting an option choice process, the result of the determination by the processor 81 in step S127 is positive. If the processor 81 determines to start option choice, the processor 81 proceeds to step S128. Otherwise, i.e., if the processor 81 determines not to start option choice, or if option choice is being performed (the option choice flag is on), the processor proceeds to step S129.

In step S128, the processor 81 executes an option choice start process, and proceeds to step S129. For example, the processor 81 refers to the communication data Db to obtain data for option choice received from a server (e.g., data managed by the server, of data required in the option choice process such as options that can be currently chosen, and the amount of coins for purchase that are possessed by the user), and updates the option data Dj based on the obtained data. Thereafter, the processor 81 sets an image (see FIG. 6) indicating a list of options that can be chosen by the user, based on the option data Dj, and displays the image on the display 12 in step S129 described below, to prompt the user to choose any of the options. In addition, the processor 81 sets the performance of the player object PO1 based on default options chosen from the list of options, based on the option data Dj, sets an image indicating the performance (see FIG. 6), and displays the image on the display 12 in step S129 described below, to present the default chosen options and the performance information to the user. Thereafter, the processor 81 sets the option choice flag on, and updates the option choice flag data Dn.

In step S129, the processor 81 determines whether or not option choice is being performed. For example, if the option choice flag indicated by the option choice flag data Dn is on, the result of the determination by the processor 81 in step S129 is positive. If option choice is being performed, the processor 81 proceeds to step S130. Otherwise, i.e., if option choice is not being performed, the processor 81 proceeds to step S131.

In step S130, the processor 81 executes the option choice process, and proceeds to step S131. The option choice process of step S130 will be described below with reference to FIG. 10.

In FIG. 10, the processor 81 determines whether or not the user has performed a chosen option change operation (step S151). For example, if the operation data Da indicates that an operation of changing options chosen from a list of options has been performed, the result of the determination by the processor 81 in step S151 is positive. If the user has performed the chosen option change operation, the processor 81 proceeds to step S152. Otherwise, i.e., if the user has not performed the chosen option change operation, the processor 81 proceeds to step S153.

In step S152, the processor 81 changes chosen options based on the user's chosen option change operation, resets the travel performance of the player object PO1 based on the changed options, and proceeds to step S153. For example, the processor 81 changes and resets options chosen from a list of options, based on the user's chosen option change operation indicated by the operation data Da, resets travel performance of the player object PO1 based on the changed options, to change the currently chosen options and the travel performance information thereof, and presents the resultant options and travel performance information to the user.

In step S153, the processor 81 determines whether or not the user has performed an option confirmation operation. For example, if the operation data Da indicates that an operation for confirming chosen options has been performed, the result of the confirmation by the processor 81 in step S153 is positive. If the user has performed the option confirmation operation, the processor 81 proceeds to step S154. Otherwise, i.e., if the user has not performed the option confirmation operation, the processor 81 proceeds to step S155.

In step S154, the processor 81 executes an option confirmation process, and proceeds to step S155. For example, the processor 81 adds up level values set for equipment and a driver character on board which have been chosen from a plurality of options and then confirmed, to calculate a total level value, and updates the player object setting data Dc. In addition, the processor 81 determines the travel performance of the player object PO1 based on the equipment and driver character on board which have been chosen from a plurality of options and then confirmed, and updates the player object setting data Dc using the determined travel performance. Thereafter, the processor 81 stores transmission data (e.g., data managed by a server such as data indicating confirmed options, and the amount of coins for purchase that have been consumed for equipment as options) into the communication data Db according to the user's option confirmation.

In step S155, the processor 81 determines whether or not to end the option choice process. For example, if chosen options have been confirmed or the user has performed an operation for ending the option choice process, the result of the determination by the processor 81 in step S155 is positive. If the processor 81 determines to end the option choice process, the processor 81 proceeds to step S156. Otherwise, i.e., if the processor 81 determines not to end the option choice process, the processor 81 ends the subroutine.

In step S156, the processor 81 executes an option choice end process, and ends the subroutine. For example, the processor 81 sets the option choice flag on, and updates the option choice flag data Dn. It should be noted that if the user has performed an operation for ending the option choice process without performing the option confirmation operation, the processor 81 may execute the option confirmation process of step S156, assuming that the currently chosen options have been confirmed.

Referring back to FIG. 9, if in step S125 it is determined that a race is under way, the processor 81 executes an in-racing process (step S126), and proceeds to step S131. The in-racing process of step S126 will be described below with reference to FIG. 11.

In FIG. 11, the processor 81 executes an other-player object action setting process (step S140), and proceeds to the next step. For example, the processor 81 moves other player objects operated by other users in the virtual space based on the communication data Db, and updates the other-player object action data Dg. In addition, if an attack object OBJ is fired by another player object's attack, the processor 81 moves the attack object OBJ in the virtual space based on the attack, and updates the other-player object action data Dg.

Next, the processor 81 determines whether or not the player object PO1 is in a state that the player object PO1 starts the "crash state" (step S141). For example, if a cause occurs which can cause the player object PO1 in the "normal travel state" that is not the "crash avoidance state" to transition to the "crash state", the result of the determination by the processor 81 in step S141 is positive. If the player object PO1 is in a state that the player object PO1 starts the "crash state", the processor 81 proceeds to step S142. Otherwise, i.e., if a cause does not occur which can cause the player object PO1 in the "normal travel state" to transition to the "crash state", or if the player object PO1 is in the "crash state" or the "crash avoidance state", the processor 81 proceeds to step S143. It should be noted that causes that can cause the player object PO1 to transition to the "crash state" are similar to those that has been described above with reference to FIG. 4 and the like, and will not be described.

In step S142, the processor 81 sets the crash period and the crash avoidance period, and proceeds to step S143. For example, the processor 81 sets the length of the crash period based on the cause of the "crash state", and stores the crash period having the length that starts from the current time into the period data Di. In addition, the processor 81 multiplies the reference crash avoidance time based on the cause of the "crash state" by the crash avoidance time ratio based on the correspondence table data Dk corresponding to the total level value of the player object PO1 indicated by the player object setting data Dc, to calculate the length (crash avoidance time) of the crash avoidance period, and stores the crash avoidance period having the length that starts immediately after the end of the crash period into the period data Di.

In step S143, the processor 81 determines whether or not the current time is in the crash period, with reference to the period data Di. If the current time is in the crash period, the processor 81 proceeds to step S144. Otherwise, i.e., if the current time is not in the crash period, the processor 81 proceeds to step S145.

In step S144, the processor 81 executes a crash action setting process, and proceeds to step S148. For example, the processor 81 sets the player object PO1 to the "crash state", and updates the player object state data Dd. Thereafter, the processor 81 causes the player object PO1 to perform an action such that the movement speed of the player object PO1 is reduced while the player object PO1 is performing a specific crash action based on the cause of the "crash state", and updates the player object action data De. For example, when the "crash state" is started in order to cause the player object PO1 to perform the specific crash action, the processor 81 may start playing back an animation in which the player object PO1 overturns or spins, or may force the player object PO1 to start performing a predetermined behavior. In addition, the processor 81 may store data relating to the player object PO1's action (e.g., data relating to the location, action, and the like of the player object PO1, and the like) as transmission data into the communication data Db. It should be noted that in step S144, the control of the player object PO1's action based on the operation data Da is not performed by the processor 81, and the player object PO1 is caused to perform a predetermined action in the "crash state".

In step S145, the processor 81 executes a normal action setting process, and proceeds to the next step. For example, the processor 81 sets the player object PO1 to the "normal travel state", and updates the player object state data Dd. Thereafter, the processor 81 sets details of a command to the player object PO1 based on the operation data Da, causes the player object PO1 to perform an action according to the details of the command, virtual physical calculation in the virtual space, influences from other player objects and virtual objects, and the like, and updates the player object action data De. In addition, if details of a command to fire an attack object OBJ from the player object PO1 is set based on the operation data Da, the processor 81 moves the attack object OBJ in the virtual space based on the details of the command, and updates the player object action data De. In addition, the processor 81 stores data relating to the player object PO1's action (e.g., data relating to the locations, actions, and the like of the player object PO1 and the attack object OBJ, the user's operation data for controlling the player object PO1's action, and the like) as transmission data into the communication data Db.

Next, the processor 81 determines whether or not the current time is in the crash avoidance period, with reference to the period data Di (step S146). If the current time is in the crash avoidance period, the processor 81 proceeds to step S147. Otherwise, i.e., if the current time is neither in the crash period nor in the crash avoidance period, the processor 81 proceeds to step S148.

In step S147, the processor 81 executes a crash avoidance action setting process, and proceeds to step S148. For example, the processor 81 sets the player object PO1 to the "crash avoidance state", and updates the player object state data Dd.

In step S148, the processor 81 determines whether or not to end the race. The race is ended, for example, if a condition for ending a race in which a plurality of player objects participate and that has already been started is satisfied, if the user has performed an operation for ending the race, or the like. If the processor 81 determines to end the race, the processor 81 proceeds to step S149. Otherwise, i.e., if the processor 81 continues the race, the processor 81 ends the subroutine.

In step S149, the processor 81 executes a process of ending the race, and ends the subroutine. For example, the processor 81 calculates points acquired by the user, based on the result of the ended game, and gives the points to the user. In addition, the processor 81 stores information indicating the result of the race as transmission data into the communication data Db. Thereafter, the processor 81 sets the in-racing flag off, and updates the in-racing flag data Dm.

Referring back to FIG. 9, in step S131, the processor 81 executes a display control process, and proceeds to the next step. As an example, the processor 81 generates a virtual space in which player objects, course objects, and the like are arranged on a course based on the player object setting data Dc, the player object action data De, the other-player object setting data Df, the other-player object action data Dg, the course object data Dh, and the like. Thereafter, the processor 81 executes a process of generating an image of the virtual space as viewed from a virtual camera that is, for example, disposed behind the player object PO1 along the course, and displaying the image on the display 12. As another example, the processor 81 executes a process of displaying, on the display 12, an option list indicating currently chosen options and information about the performance thereof, based on the option data Dj and the results of steps S128 and S130.

Next, the processor 81 executes a communication process (step S132), and proceeds to the next step. For example, the processor 81 executes a process of receiving data transmitted from the server and game systems 1 operated by other users participating in the race, and updates the communication data Db using the received data. In addition, the processor 81 transmits transmission data stored in the communication data Db to the server and game systems 1 operated by other users at predetermined transmission intervals.

Next, the processor 81 determines whether or not to end the game (step S133). In step S133, the game is ended, for example, if a condition for ending the game is satisfied, the user has performed an operation for ending the game, or the like. If the processor 81 determines not to end the game, the processor 81 returns to step S122, and repeats the process. Otherwise, i.e., if the processor 81 determines to end the game, the processor 81 ends the flowchart. Following this, steps S122 to S133 are repeatedly executed until the processor 81 determines to end the game in step S133.

Thus, in the present example, the length of the period of time of the crash avoidance state in which the "crash state" can be avoided is determined according to options chosen by the user. Therefore, the user is highly likely to choose various options according to race strategies, resulting in an improvement in the diversity of a game.

It should be noted that, as described above, in the present example, the "crash state" may be set such that a crash does not occur again for a player object that is in the "crash state". It should be noted that, in another example, when a cause of the "crash state" additionally occurs in a player object in the "crash state", the player object may transition to the "crash state" again. In that case, from the time when a cause of the "crash state" additionally occurs in a player object in the "crash state", the crash period of the "crash state" starts again.

In addition, in the present example, the "crash state" is set such that a crash does not occur again for a player object that is in the "crash state", and the "crash avoidance state" corresponds to a period of time that is determined based on options and starts from the time of returning to the "normal travel state". In another example, the "crash state" may be set such that a crash may occur for a player object that is in the "crash state", and the starting point of the period of time of the "crash avoidance state" determined based on options may be the time when the "crash state" occurs. In that case, the "crash avoidance state" may end during the period of time of the "crash state" or after returning to the "normal travel state".

In addition, various operations such as the user's accelerating operation, braking operation, steering operation, and item use operation may be performed by touch operations performed on the touch panel 13, operations of changing motions and/or orientations of the main body apparatus 2, the left controller 3, and/or the right controller 4, or the like.

In addition, in the above examples, player objects race against each other, traveling on a course. Alternatively, player objects may race against each other in a game, moving in other forms. For example, mobile bodies such as ships or submarines navigating and moving on or under water, mobile bodies such as aircrafts or rockets flying and moving in the air, mobile bodies moving under the ground through digging, or the like may race against each other in a game. In addition, player characters themselves may run, swim, or move through digging in a race in a game. In those cases, at least both the movement performance and the lengths of the period of times of the crash avoidance states of the mobile bodies and the player characters may be set based on options chosen by the user.

The game system 1 may be any suitable device, including general personal computers, stationary game apparatuses, mobile telephones, smartphones, handheld game apparatuses, personal digital assistants (PDAs), cameras, tablet computers, and the like.

In the foregoing, every one of the information processes (game processes) is performed in the game system 1 by way of example. Alternatively, at least a portion of the process steps may be performed in another apparatus. For example, when the game system 1 can also communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information process (game process) may be executed by a single processor or a plurality of cooperating processors included in an information processing system including at least one information processing apparatus. In the above example, the information processes can be performed by the processor 81 of the game system 1 executing predetermined programs. Alternatively, all or a portion of the above processes may be performed by a dedicated circuit included in the game system 1.

Here, according to the above variation, the present example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of step S may be performed by substantially any of the apparatuses, and the present example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present example and common technical knowledge. It should be understood throughout the present specification that expression of a singular form includes the concept of its plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present example pertain. If there is any inconsistency or conflict, the present specification (including the definitions) shall prevail.

As described above, the present example is useful as a storage medium, game program, game apparatus, game system, game processing method, and the like for the purpose of improving the diversity of a game.

What is claimed is:

1. A non-transitory computer-readable storage medium having stored therein instructions that, when executed, cause a computer of an information processing apparatus to execute game processing for executing a racing game using a plurality of player objects operated by a plurality of users, respectively, in a virtual space, the game processing comprising:

selecting at least one option, from a plurality of options, relating to performance of a player object including at least both a first parameter relating to a crash avoidance time and a second parameter relating to movement performance, according to an operation input performed by a user;

executing the racing game using the plurality of player objects based on performance of each player object determined based on the selected option;

causing the player object to attack another player object in the racing game;

causing the player object to temporarily crash due to an influence of the attack, wherein control of the player object is limited during temporarily crashing due to the influence of the attack;

causing the crashed player object to transition to a crash avoidance state in which the crashed player object is forbidden to crash again due to an influence of at least one of attacks, for the crash avoidance time determined based on the first parameter;

causing the player object to return to a normal state and controlling the player object according to the operation input performed by the user; and generating, for display, a virtual space having one or more objects representing the plurality of player objects, wherein the first parameter corresponds to a ratio with respect to a reference crash avoidance parameter, and in the causing the crashed player object to transition to the crash avoidance state, the crash avoidance time is calculated by multiplying the reference crash avoidance parameter by the ratio corresponding to the first parameter.

2. The non-transitory computer-readable storage medium according to claim 1, wherein in the causing the crashed player object to transition to the crash avoidance state, the reference crash avoidance parameter is changed based on a cause of the crash of the crashed player object, and the crash avoidance time of the crashed player object is calculated.

3. The non-transitory computer-readable storage medium according to claim 1, wherein the game processing further comprises:

controlling an action of the player object operated by the user, according to the operation input, in the causing the player object to temporarily crash, the player object in the crash is caused to transition to a state in which at least acceleration of the player object performed according to the operation input is limited, and in the causing the crashed player object to transition to the crash avoidance state, the crash avoidance time is set such that at least a period of time from the time of end of a crash period of the crash is included in the crash avoidance time.

4. The non-transitory computer-readable storage medium according to claim 3, wherein in the causing the player object to temporarily crash, the length of the crash period of the crashed player object is set irrespective of the first parameter set for the crashed player object.

5. The non-transitory computer-readable storage medium according to claim 4, wherein in the causing the player object to temporarily crash, the length of the crash period of the crashed player object is set based on a cause of the crash of the crashed player object, and in the causing the crashed player object to transition to the crash avoidance state, the crash avoidance time of the crashed player object is set based on the cause of the crash of the crashed player object.

6. The non-transitory computer-readable storage medium according to claim 1, wherein selecting from the plurality of options includes displaying an image for prompting to choose from the plurality of option on a display screen, and in the displaying the image for prompting to choose, the movement performance determined based on the second parameter set based on the chosen option is displayed on the display screen without the first parameter set based on the chosen option being displayed on the display screen.

7. The non-transitory computer-readable storage medium according to claim 1, wherein in executing the racing game, a different appearance is set for the player object, depending on the selected option, and the racing game is executed using the plurality of player objects having the respective appearances.

8. The non-transitory computer-readable storage medium according to claim 1, wherein in the causing the player object to temporarily crash, the player object is caused to crash due to an influence of an object present in the virtual space without based on the attack of the player object performed in the causing the player object to attack said another player object, and in the causing the crashed player object to transition to the crash avoidance state, the crashed player object is forbidden to crash again due to an influence of at least a portion of the objects present in the virtual space, for the crash avoidance time.

9. The non-transitory computer-readable storage medium according to claim 1, wherein the crash avoidance time changes depending upon a selected player character and selected equipment associated with the player character.

10. A game apparatus comprising:

a display; and processing circuitry including at least a processor and a memory storing instructions for executing a racing game using a plurality of player objects operated by a plurality of users, respectively, in a virtual space, wherein the processing circuitry is configured to:

select at least one option, from a plurality of options, relating to performance of a player object including at least both a first parameter relating to a crash avoidance time and a second parameter relating to movement performance, according to an operation input performed by a user;

execute the racing game using the plurality of player objects based on performance of each player object determined based on the selected option;

cause the player object to attack another player object in the racing game;

cause the player object to temporarily crash due to an influence of the attack, wherein control of the player object is limited during temporarily crashing due to the influence of the attack;

cause the crashed player object to transition to a crash avoidance state in which the crashed player object is forbidden to crash again due to an influence of at least one of attacks, for the crash avoidance time determined based on the first parameter; and generate a virtual space, displayable by the display, having one or more objects representing the plurality of player objects, wherein the first parameter corresponds to a ratio with respect to a reference crash avoidance parameter, and in the causing the crashed player object to transition to the crash avoidance state, the crash avoidance time is calculated by multiplying the reference crash avoidance parameter by the ratio corresponding to the first parameter.

11. A game system comprising:

a processor; and a memory storing instructions for executing a racing game using a plurality of player objects operated by a plurality of users, respectively, in a virtual space, wherein instructions, when executed, cause the game system to:

select at least one option, from a plurality of options, relating to performance of a player object including at least both a first parameter relating to a crash avoidance time and a second parameter relating to movement performance, according to an operation input performed by a user;

execute the racing game using the plurality of player objects based on performance of each player object determined based on the chosen option;

cause the player object to attack another player object in the racing game;

cause the player object to temporarily crash due to an influence of the attack, wherein control of the player object is limited during temporarily crashing due to the influence of the attack;

cause the crashed player object to transition to a crash avoidance state in which the crashed player object is forbidden to crash again due to an influence of at least one of attacks, for the crash avoidance time determined based on the first parameter; and generate, for display, a virtual space having one or more objects representing the plurality of player objects, wherein the first parameter corresponds to a ratio with respect to a reference crash avoidance parameter, and in the causing the crashed player object to transition to the crash avoidance state, the crash avoidance time is calculated by multiplying the reference crash avoidance parameter by the ratio corresponding to the first parameter.

12. A game processing method for executing a racing game using a plurality of player objects operated by a plurality of users, respectively, in a virtual space, the game processing method comprising:

selecting at least one option, from a plurality of options, relating to performance of a player object including at least both a first parameter relating to a crash avoidance time and a second parameter relating to movement performance, according to an operation input performed by a user;

executing the racing game using the plurality of player objects based on performance of each player object determined based on the selected option;

causing the player object to attack another player object in the racing game;

causing the player object to temporarily crash due to an influence of the attack, wherein control of the player object is limited during temporarily crashing due to the influence of the attack;

causing the crashed player object to transition to a crash avoidance state in which the crashed player object is forbidden to crash again due to an influence of at least one of attacks, for the crash avoidance time determined based on the first parameter, and generating, for display, a virtual space having one or more objects representing the plurality of player objects, wherein the first parameter corresponds to a ratio with respect to a reference crash avoidance parameter, and in the causing the crashed player object to transition to the crash avoidance state the crash avoidance time is calculated by multiplying the reference crash avoidance parameter by the ratio corresponding to the first parameter.

13. The game processing method according to claim 12, wherein in the causing the crashed player object to transition to the crash avoidance state, the reference crash avoidance parameter is changed based on a cause of the crash of the crashed player object, and the crash avoidance time of the crashed player object is calculated.

14. The game processing method according to claim 12, further comprising:

controlling an action of the player object operated by the user, according to the operation input, wherein in the causing the player object to temporarily crash, the player object in the crash is caused to transition to a state in which at least acceleration of the player object performed according to the operation input is limited, and in the causing the crashed player object to transition to the crash avoidance state, the crash avoidance time is set such that at least a period of time from the time of end of a crash period of the crash is included in the crash avoidance time.

15. The game processing method according to claim 14, wherein in the causing the player object to temporarily crash, the length of the crash period of the crashed player object is set irrespective of the first parameter set for the crashed player object.

16. The game processing method according to claim 15, wherein in the causing the player object to temporarily crash, the length of the crash period of the crashed player object is set based on a cause of the crash of the crashed player object, and in the causing the crashed player object to transition to the crash avoidance state, the crash avoidance time of the crashed player object is set based on the cause of the crash of the crashed player object.

17. The game processing method according to claim 12, wherein selecting from the plurality of options includes displaying an image for prompting to choose from the plurality of option on a display screen, and in displaying the image for prompting to choose, the movement performance determined based on the second parameter set based on the chosen option is displayed on the display screen without the first parameter set based on the chosen option being displayed on the display screen.

18. The game processing method according to claim 12, wherein in the executing the racing game, a different appearance is set for the player object, depending on the selected option, and the racing game is executed using the plurality of player objects having the respective appearances.

19. The game processing method according to claim 12, wherein in the causing the player object to temporarily crash, the player object is caused to crash due to an object present in the virtual space without based on the attack of the player object performed in the causing the player object to attack said another player object, and in the causing the crashed player object to transition to the crash avoidance state, the crashed player object is forbidden to crash again due to an influence of at least a portion of the objects present in the virtual space, for the crash avoidance time.

20. The non-transitory computer-readable storage medium according to claim 9, wherein the selected equipment includes any of a frame of a vehicle and tires of the vehicle.

* * * * *